June 23, 1942.　　A. M. NIVEN　　2,287,634
LOCKING PIN
Filed May 31, 1941
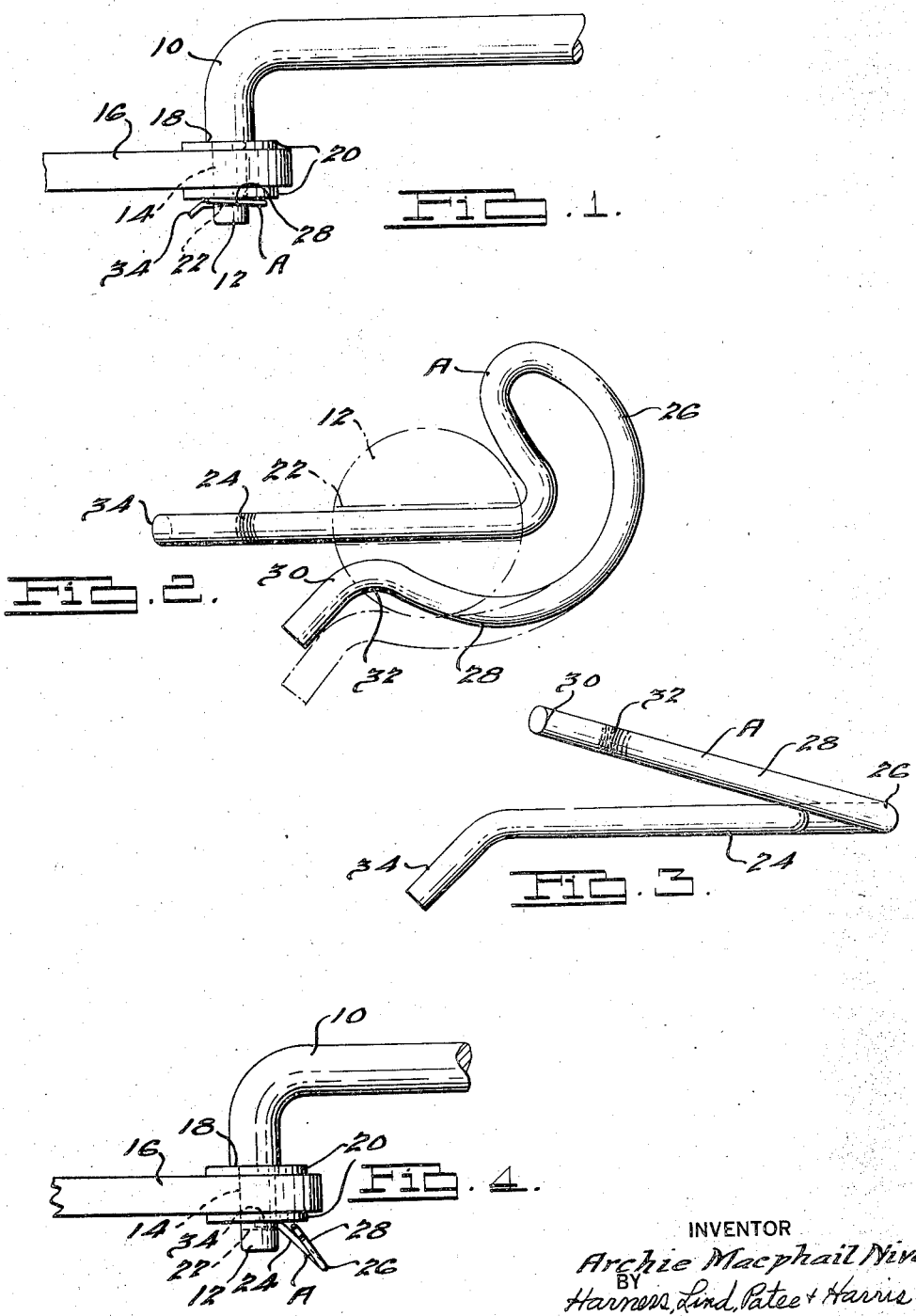
INVENTOR
Archie Macphail Niven
BY
Harness, Lind, Patee & Harris
ATTORNEYS.

Patented June 23, 1942

2,287,634

UNITED STATES PATENT OFFICE 2,287,634

LOCKING PIN

Archie Macphail Niven, Detroit, Mich., assignor to Chrysler Corporation, Highland Park, Mich., a corporation of Delaware Application May 31, 1941, Serial No. 395,969

1 Claim. (Cl. 85—8.5)

This invention relates to a locking pin for securing two parts together such as a pivoted rod and link connection.

An object of the invention is to provide a locking pin of a single length of spring wire which may be readily inserted in an opening of one of the inter-connected members and to provide an offset portion which resiliently urges the members together to prevent rattle.

Another object of the invention is to provide a locking pin of the type referred to having a straight portion to be received in the opening and a return bent portion forming a loop whereby when said pin is applied to one of said members it will be sprung outwardly to embrace a portion of that member to thereby hold the locking pin in place.

A further object of the invention is to provide a locking pin having a straight portion, a head portion to embrace a portion of one of a plurality of members assembled together, an offset portion of the head portion for urging the assembled members together to prevent rattle, and an oppositely offset portion at the end of the locking pin opposite to the head for assuring the proper insertion of the pin to cause the first mentioned offset member to urge the members together.

Other objects and advantages of the invention will more fully appear from the following description taken in connection with the accompanying drawing, in which:

Fig. 1 is a view showing in side elevation one adaptation of the locking pin as applied to a rod and link connection such as might be used in a link connection for a carburetor control.

Fig. 2 is an enlarged view of the locking pin shown in side elevation before it is applied to a part to be locked with dotted lines showing the part and its sprung position when it has been applied to the part.

Fig. 3 is a side view of the locking pin shown in Fig. 2.

Fig. 4 is a view corresponding to Fig. 1 but showing the locking pin partially inserted in an opening.

Referring to the drawing I have shown a pivotal connection wherein a rod 10 has a reduced portion 12 which is received in an opening 14 in a link 16. The reduced portion 12 forms a shoulder 18. Washers 20 may be placed on opposite sides of the link 16. An opening 22 extending at right angles to the axis of the rod end 12 is positioned beyond the link 16 to receive my improved locking pin A.

The locking pin is formed from a single length of spring wire bent to the desired shape. It comprises a straight portion 24 to be received in an opening in a part to be secured to another part, a head portion 26 which is return bent forming a loop in a plane at right angles to the axis of the part receiving the locking pin, and a free end portion 28 which is an extension of the head 26. The end portion 28 is bent out of the plane of the head portion as shown in Fig. 3 to extend at an acute angle to the axis of the straight portion 24. The end 30 of the end portion 28 is first bent inwardly toward the straight portion 24 and is a distance therefrom less than one-half the thickness of the part which is to receive the locking pin, and then away from the straight portion 24 to form a rounded portion 32 to engage the part receiving the pin when the pin is assembled.

When the pin is assembled, the rounded portion 32 permits easy assembly by freely sliding over the part receiving the pin to spring the portion 28 outwardly and into holding engagement with the part; the latter fitting within the curved portion of the loop in the head 26.

It is important that the locking pin be assembled in such a manner that the free end portion 28 is directed toward the link 16 so that it urges the link 16 toward the shoulder 18. To assure proper assembly, the outer end 34 of the portion 24 is bent out of axial alignment with the portion 24 and in a direction opposite to the direction of the portion 28. By referring to Fig. 4 it will be seen that the locking pin can only be inserted as indicated. If the pin was turned over the body of the pin would strike the link 16 and the end 34 could not be axially aligned with the opening 22. By this design the locking pin can never be assembled with the spring portion 28 extending away from the link or part to be urged against its associated part.

It will be understood that various changes, including size, shape and arrangement of parts, may be made without departing from the spirit of my invention and it is not my intention to limit its scope other than by the terms of the appended claim.

I claim:

A locking pin for reception in an opening extending at right angles to the axis of a bolt or rod comprising a straight body portion adapted to be inserted in the opening, a head portion being return bent inwardly and in a plane substantially at right angles to the axis of the bolt or rod, a portion of said head being bent out of the plane in one direction, and a portion at the free end of said straight body portion being bent in an opposite direction to the plane of said head but being capable of being forced through the opening in the bolt or rod.

ARCHIE MACPHAIL NIVEN.